Patented Oct. 8, 1935

2,016,342

UNITED STATES PATENT OFFICE 2,016,342

PROCESS OF SWEETENING PETROLEUM OIL

Philip S. Nisson, Brooklyn, N. Y., assignor to The Gray Processes Corporation, Newark, N. J., a corporation of Delaware No Drawing. Application December 23, 1930, Serial No. 504,425

17 Claims. (Cl. 196—33)

This invention relates to treatment of petroleum hydrocarbons and more especially to the treatment known as "doctor sweetening".

It is well-known that gasoline or other petroleum hydrocarbon which is sour to the doctor test contains mercaptans and/or hydrogen sulphide. The removal of these compounds is generally accomplished by treatment known as "doctor sweetening". The conventional method known to the art is to agitate the sour product with sodium plumbite solution, thereby removing hydrogen sulphide by the precipitation of lead sulphide and converting the mercaptan to lead mercaptides, some of which remain in the petroleum product. Sulphur is then added and the agitation continued. The function of the sulphur is to convert the lead mercaptides into disulphides and lead sulphide, the latter of which precipitates. The disulphides formed remain in the oil, but are sweet to the doctor test. The precipitation of lead sulphide and consequent clarification of the mixture is known as breaking.

In the above described method of doctor sweetening, it is almost impossible to avoid adding an excess of sulphur over that required for the reaction. If this excess is considerable, it results in the sweetened oil having a poor corrosion test, that is, the oil will discolor copper when heated in contact with it. However, even if the excess of sulphur is not sufficient to give a poor corrosion test, it results in poor stability of the oil, especially when it is exposed to light. Thus, gasoline sweetened by the ordinary treatment on exposure to light in glass vessels will rapidly change from a clear colorless liquid to a cloudy yellow liquid, if even a trace of excess sulphur has been added during the sweetening operation.

An object of the present invention is a modified doctor sweetening process by which the end point or breaking of the mixture may be more carefully controlled and the sweetening operation completed without the addition of any excess of sulphur.

According to my improved method, I agitate the oil to be sweetened, which may be straight run or cracked gasoline, or kerosene or other like petroleum oil with a solution of sodium plumbite known in the trade as doctor solution. In some cases, where large amounts of hydrogen sulphide are present, I may wash the oil with water or with a caustic soda solution before agitating the oil with plumbite. After having agitated the oil with the doctor solution I add sulphur, either solid or dissolved in some of the oil, in small increments with agitation of the oil between the additions. I am careful, however, not to add sufficient sulphur to completely break the mixture. I usually determine by careful testing of a small sample how much sulphur is required to break the mixture and then use preferably 90% or less of this amount. After this amount of sulphur has been added, I continue the agitation for a time and then allow the mixture to settle. I next draw off the lower layer consisting of sodium plumbite solution and considerable amount of precipitated lead sulphide. I now preferably wash the remaining oil several times with water, removing the water after each wash. Next, I introduce small amounts of a hypochlorite solution at intervals and again agitate the mixture. The hypochlorite solution may be calcium hypochlorite, sodium hypochlorite or solutions of other salts of hypochlorous acid and I prefer to use a solution containing one to six grams of available chlorine per liter. The addition of the hypochlorite solution completes the breaking of the mixture by converting the remaining lead mercaptides to disulphides and precipitating the lead. Finally, I separate the hpochlorite solution from the oil and wash the oil with water.

By treating in the above manner, I am able to avoid adding an excess of sulphur and am able better to control the end point since at the end of the operation I am using solutions of known concentration which can be very carefully controlled. I am aware that the use of hypochlorite by itself has been proposed for sweetening gasoline, but its use has frequently resulted in unstable products. It has also been proposed to sweeten with sodium plumbite and replace the sulphur in its entirety with hypochlorite. Here too, however, especially when sweetening cracked products undesirable side reactions occur and the product is unstable. Consequently, this method has not been used commercially.

Oil sweetened by the method above described is free of the instability and corrosion difficulties which are commonly encountered with doctor sweetened products. I am able to avoid the undesirable consequences of sweetening with sodium plumbite and sulphur in the conventional manner and also to avoid the undesirable consequences of sweetening with hypochlorite. The product is a colorless, stable, non-corrosive, doctor sweet oil.

I claim:

1. The process of sweetening petroleum oil which comprises agitating the oil with sodium plumbite solution, adding sulphur in an amount slightly less than required to complete the reaction, separating the reaction products and then completing the reaction by treatment with a solution of a salt of hypochlorous acid.

2. The process of sweetening petroleum oil which comprises agitating the oil with sodium plumbite solution, adding sulphur in an amount slightly less than required to complete the reaction, separating the reaction products, water-washing the remaining oil and then completing the reaction by treatment with a solution of a salt of hypochlorous acid.

3. The process of sweetening petroleum oil which comprises agitating the oil with sodium plumbite solution, adding sulphur in an amount slightly less than required to complete the reaction, separating the reaction products and then completing the reaction by treatment with sodium hypochlorite.

4. The process of sweetening cracked hydrocarbons which comprises agitating the hydrocarbons with sodium plumbite solution, adding sulphur in an amount slightly less than required to complete the reaction, separating the reaction products and then completing the reaction by treatment with calcium hypochlorite.

5. The process of sweetening cracked hydrocarbons which comprises agitating the hydrocarbons with sodium plumbite solution, adding sulphur in an amount slightly less than required to complete the reaction, separating the reaction products and then completing the reaction by treatment with a solution of one of the group comprising alkali and alkali earth hypochlorites.

6. The process of sweetening cracked hydrocarbons which comprises agitating the hydrocarbons with sodium plumbite solution, adding sulphur in an amount slightly less than required to complete the reaction, separating the reaction products, water-washing the treated hydrocarbons and then completing the reaction by treatment with sodium hypochlorite.

7. The process of sweetening cracked hydrocarbons which comprises agitating the hydrocarbons with sodium plumbite solution, adding sulphur in an amount slightly less than required to complete the reaction, separating the reaction products, water-washing the treated hydrocarbons and then completing the reaction by treatment with calcium hypochlorite.

8. The process of sweetening cracked hydrocarbon oil which comprises agitating the oil with sodium plumbite solution, determining from a sample of the doctor treated hydrocarbon the amount of sulphur required to complete the reaction, adding slightly less than the required amount of sulphur, separating the reaction products and then completing the reaction by treatment with a solution of a salt of hypochlorous acid.

9. The process of sweetening cracked hydrocarbon oil which comprises agitating the oil with sodium plumbite solution, adding approximately 90% of the amount of sulphur required to complete the reaction, separating the reaction products and completing the reaction by treatment with a solution of a salt of hypochlorous acid.

10. The process of sweetening cracked hydrocarbon oil which comprises agitating the oil with sodium plumbite solution, determining from a sample of the doctor treated hydrocarbon the amount of sulphur required to complete the reaction, adding approximately 90% of the required amount of sulphur, separating the reaction products and completing the reaction by treatment with a solution of a salt of hypochlorous acid.

11. The process of sweetening cracked hydrocarbon oil which comprises agitating the oil with sodium plumbite solution, determining from a sample of the doctor treated hydrocarbon the amount of sulphur required to complete the reaction, adding slightly less than the required amount of sulphur, separating the reaction products and then completing the reaction by treatment with sodium hypochlorite.

12. The process of sweetening cracked hydrocarbon oil which comprises agitating the oil with sodium plumbite solution, adding approximately 90% of the amount of sulphur required to complete the reaction, separating the reaction products and completing the reaction by treatment with sodium hypochlorite.

13. The process of sweetening cracked hydrocarbon oil which comprises agitating the oil with sodium plumbite solution, determining from a sample of the doctor treated hydrocarbon the amount of sulphur required to complete the reaction, adding approximately 90% of the required amount of sulphur, separating the reaction products and completing the reaction by treatment with sodium hypochlorite.

14. The process of sweetening cracked hydrocarbon oil which comprises agitating the oil with sodium plumbite solution, determining from a sample of the doctor treated hydrocarbon the amount of sulphur required to complete the reaction, adding slightly less than the required amount of sulphur, separating the reaction products and then completing the reaction by treatment with calcium hypochlorite.

15. The process of sweetening cracked hydrocarbon oil which comprises agitating the oil with sodium plumbite solution, adding approximately 90% of the amount of sulphur required to complete the reaction, separating the reaction products and completing the reaction by treatment with calcium hypochlorite.

16. The process of sweetening cracked hydrocarbon oil which comprises agitating the oil with sodium plumbite solution, determining from a sample of the doctor treated hydrocarbon the amount of sulphur required to complete the reaction, adding approximately 90% of the required amount of sulphur, separating the reaction products and completing the reaction by treatment with calcium hypochlorite.

17. The process for sweetening petroleum and petroleum distillates carried out in two stages, the first stage consisting of a treatment with sodium plumbite followed by an oxidizing treatment in the use of free sulphur, while the second stage consists in a treatment with chlorine compound, such as sodium hypochlorite, in relatively small proportion for the transformation of the remaining sulphur compounds that affect the sweetness of the oil.

PHILIP S. NISSON.